(No Model.)

L. D. MASON.
TEMPER SCREW.

No. 446,994. Patented Feb. 24, 1891.

Witnesses.
Cora J. Blakley
Harriet Johnson

Lewis D. Mason, Inventor.
By James Sangster,
Attorney.

UNITED STATES PATENT OFFICE.

LEWIS D. MASON, OF BUFFALO, NEW YORK.

TEMPER-SCREW.

SPECIFICATION forming part of Letters Patent No. 446,994, dated February 24, 1891.

Application filed February 28, 1890. Serial No. 342,147. (No model.)

*To all whom it may concern:*

Be it known that I, LEWIS D. MASON, a citizen of the United States, residing in Buffalo, in the county of Erie and State of New York, have invented certain new and useful Improvements in Temper-Screws, of which the following is a specification.

The object of my invention is to produce a temper-screw for deep well-boring that will be capable of sustaining the heavy weight necessary for such purposes, and at the same time be adapted to be easily turned when required, all of which will be fully and clearly hereinafter described and claimed, reference being had to the accompanying drawings, in which—

Figure 1:
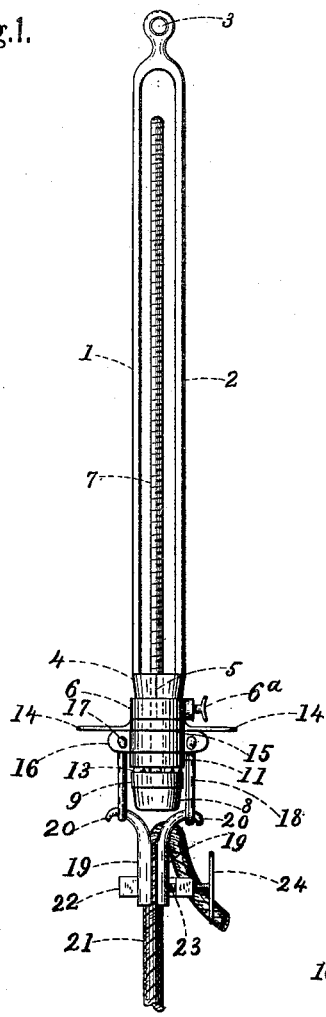
Figure 2:
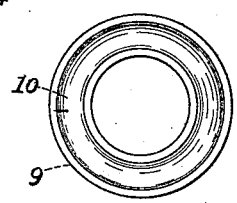
Figure 3:
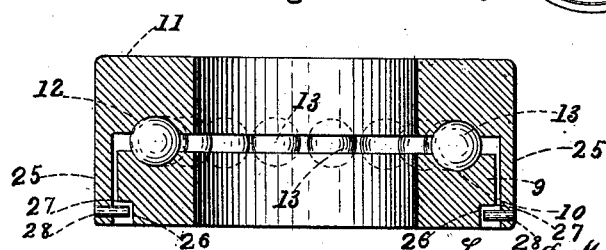

Figure 1 is a side elevation of a temper-screw constructed in accordance with my invention. Fig. 2 is a detached inside top view of one of the bearing-rings. Fig. 3 is an enlarged detached sectional elevation of the bearing.

In said drawings, 1 and 2 represent the frame of the temper-screw. It is provided with the usual eye 3, by which it is suspended. At the lower end is the usual split portion 4, being split at the point 5, so that when the collar 6 is taken off the parts 1 and 2 will spring apart at the bottom sufficiently to permit the supporting-screw 7 to be moved up or down without turning it. The collar 6 is provided with a hand set-screw 6ª to tighten it when in place. This supporting bolt or screw 7 is provided with a large head 8, and resting on the head 8 is a hardened-steel bearing-ring 9, surrounding the bolt 7. In the top bearing portion of the ring 9 is an annular concave ball-bearing 10. (See Figs. 2 and 3.) Above the ring 9, also surrounding the bolt 7, is another hardened-steel bearing-ring 11, having a corresponding circular concave ball seat or bearing 12. Between the ball-bearings 10 and 11 is a series of hardened-steel balls 13. These balls 13 are made very hard and are slightly harder than the seats in which they turn; but the seats or bearings are still quite hard. This construction is important because it prevents the cracking or breaking of the balls, an objection which would certainly follow if the seats were as hard as the balls. Above the ball-bearing is located the usual arms 14 for lowering or raising the screw-bar 7, and just below the arms 14 is the swivel 15. This swivel 15 is provided with two extension portions 16, having holes through which the hook ends 17 of the links 18 are secured. To the lower ends of the links 18 are secured the two concave clamping-bars 19, which hook into said links at the points 20. The clamping-bars are kept tight when a rope 21 is put in between them by means of a C-clamp 22 and screw 23, provided with arms 24 for turning it so as to tighten the clamps to the rope, substantially as shown in Fig. 1.

The object of the ball-bearing is to provide the means for sustaining the heavy suspended weight and at the same time provide a comparatively frictionless bearing which can be easily operated, and by making the rings 9 and 11 separate from the other parts they can be made more cheaply and better, and in case of an accident either a portion or all of the bearing can be removed and the temper-screw can be operated in the ordinary manner—that is, with the swivel resting on the head 8 of the bolt 7. Another advantage arises from placing the bearing below the screw-frame, which avoids the necessity of turning the frame and screw whenever it is necessary to turn the rope and drill, whereas if the bearing were placed at the top of the frame the entire mechanism would have to be turned around with the almost constant rotation or turning of the rope and drill.

In Fig. 3 I have shown a downwardly projecting rim 25, forming a part of the upper half of the bearing, which fits easily over the periphery of the lower half of the bearing, and at the bottom of the lower half is a reduced portion 26, leaving the shoulder 27, and projecting inward from the rim 25 is a series of two, three, or more pins 28, the object of which is to keep the upper and lower portions of the bearings from accidentally coming apart, thereby keeping the hardened-steel balls securely in place.

I claim as my invention—

A temper-screw consisting of a suspending-frame, a screw 7, provided with an enlarged head 8 and adapted to screw up or down in said frame, in combination with a suspending swivel above the head, turning arms 14 above the swivel, an upper and lower bearing-ring, each having a circular concave bearing-seat, and a series of balls interposed between the two, said rings and balls being located between the swivel and the head of the rod, substantially as described.

LEWIS D. MASON.

Witnesses:
 JAMES SANGSTER,
 CORA J. BLAKELY.